US007228126B2

(12) United States Patent
Hayashi

(10) Patent No.: US 7,228,126 B2
(45) Date of Patent: Jun. 5, 2007

(54) PORTABLE COMMUNICATION TERMINAL AND METHOD OF TRANSMISSION OF ELECTRONIC MAIL

(75) Inventor: Keiichi Hayashi, Tokyo (JP)

(73) Assignee: NEC Corporation, Tokyo (JP)

(*) Notice: Subject to any disclaimer, the term of this patent is extended or adjusted under 35 U.S.C. 154(b) by 7 days.

(21) Appl. No.: 11/084,146

(22) Filed: Mar. 21, 2005

(65) Prior Publication Data

US 2005/0221803 A1 Oct. 6, 2005

(30) Foreign Application Priority Data

Mar. 31, 2004 (JP) ............................ 2004-103585

(51) Int. Cl.
*H04M 3/00* (2006.01)

(52) U.S. Cl. ...................... 455/419; 455/418; 455/420; 455/41.2; 455/557; 455/558

(58) Field of Classification Search ................ 455/419, 455/418, 420, 421, 41.2, 558, 557
See application file for complete search history.

(56) References Cited

U.S. PATENT DOCUMENTS 6,360,101 B1 * 3/2002 Irvin ....................... 455/456.6
6,473,790 B1 10/2002 Tagi
2002/0082002 A1 * 6/2002 Fujii .......................... 455/419
2004/0002305 A1 1/2004 Bridgit et al.
2004/0104267 A1 6/2004 Takaki

FOREIGN PATENT DOCUMENTS

CN 1505430 A 6/2004
EP 0 881 848 A2 5/1998
JP 2002-298169 * 10/2002
JP 2002-298169 * 11/2002

OTHER PUBLICATIONS

European Search Report dated Aug. 21, 2006.

* cited by examiner

*Primary Examiner*—Joseph Feild
*Assistant Examiner*—Khai Nguyen
(74) *Attorney, Agent, or Firm*—McGinn IP Law Group, PLLC

(57) ABSTRACT

A portable communication terminal includes a non-contact IC card. The non-contact IC card receives, from a passage verification apparatus, information indicating a passage of the non-contact IC card through the passage verification apparatus including a gate for verifying a passage; a passage detection device receives the information on the passage from the non-contact IC card, and then detects the passage of the portable communication terminal through the passage verification apparatus; and a mail transmission control device controls transmission of the electronic mail reserved for transmission in accordance with the detection.

10 Claims, 5 Drawing Sheets

PORTABLE COMMUNICATION TERMINAL AND METHOD OF TRANSMISSION OF ELECTRONIC MAIL

BACKGROUND OF THE INVENTION

1. Field of the Invention

The present invention relates to a portable communication terminal and a method of transmission of an electronic mail and, more particularly, to a method of transmission of an electronic mail by use of a portable communication terminal which can detect a passage through a passage verification apparatus including a gate and ticket gate through which a passage is verified and by use of a portable communication terminal equipped with a non-contact IC card.

2. Description of the Related Art

There are an increasing number of people who are using a mail function of a cellular phone in accordance with rising proliferation of portable communication terminals such as cellular phones. The use of this mail function is accelerating in various communication scenarios, such as occasions of rendezvous in railway stations and theaters, and communications to inform on leaving for home from the railway stations and the theaters. Moreover, the cellular phone has excellent portability. Consequently, with a non-contact IC card equipped therein, a service in which the cellular phone is used to pass through an entrance/exit of theaters is under consideration. And a service in which the cellular phone is used to pass through a ticket gate of railway stations is under consideration.

For example, Japanese Patent Laid-Open No. 2002-298169 discloses a routing assistance system using a portable communication terminal equipped with a non-contact IC card. In this routing assistance system, information on a commuter pass such as a usable range of stations and a valid time period for commuting are previously stored in the non-contact IC card.

At the first time, automatic ticket gating is performed using the information on the commuter pass through the non-contact IC card when the portable communication terminal passes through an automatic gate. At the time when the automatic gating is performed, the portable communication terminal receives information on the entrance station transmitted from the automatic ticket gate, and in addition the current time is acquired from the inside clock means. Next, the portable communication terminal receives destination information from the user prior or even after passing through the automatic ticket gate. Thereafter, the portable communication terminal transmits information on the entrance station, the time at entrance, and the destination to a route search server. Finally, the portable communication terminal receives a result of route search from the route search server, and displays it.

As described above, the routing assistance system disclosed in Japanese Patent Laid-Open No. 2002-298169 uses a portable communication terminal equipped with a non-contact IC card as a portable communication terminal for substituting a commuter pass. However, this system only allows a user of the portable communication terminal to pass through a ticket gate, using this portable communication terminal as a commuter pass based on the functionality of a non-contact IC card. Adding to this, the system only allows the portable communication terminal to display a routing assistance when passing through a ticket gate.

Therefore, in the conventional portable communication terminal described hereinbefore, it is not possible for the portable communication terminal to automatically transmit an electronic mail with which the passage of the terminal at a ticket gate is reported to someone to whom a user of the terminal wants to inform his passage at the ticket gate.

Because of this, in the conventional portable communication terminal, a user of the portable communication terminal manually writes an electronic mail which the user wants to transfer at the time of exit and entrance at a ticket gate. Then, the user manually transmits the electronic mail to someone to whom the user wants to send an electronic mail. It is bothersome. Here, the content to be transferred by the electronic mail is a message, for example, "On the way home from the station", "Arrival at an exit of the station" or "Now, entering the station and on the way to get to the destination"

SUMMARY OF THE INVENTION

In view of the foregoing and other exemplary problems, drawbacks, and disadvantages, an exemplary portable communication terminal of the present invention, is capable of detecting a passage through a passage verification apparatus including a gate for verifying a passage. The terminal detects a passage through the passage verification apparatus, and after the detection, controls transmission of an electronic mail which has been reserved for transmission.

Moreover, the exemplary portable communication terminal of the present invention is a portable communication terminal which includes: a non-contact IC card which receives, from a passage verification apparatus, information indicating a passage of the non-contact IC card through the passage verification apparatus including gate for verifying a passage; passage detector for detecting a passage of the portable communication terminal through the passage verification apparatus by receiving the information on the passage from the non-contact IC card; and mail transmission controller for controlling transmission of an electronic mail reserved for transmission in accordance with the detection.

An exemplary transmission method of an electronic mail with a portable communication terminal of the present invention includes: detecting a passage when the portable communication terminal passes through a passage verification apparatus including a gate which verifies a passage; and controlling transmission of electronic mail which is reserved for transmission after detection of the passage.

Furthermore, the exemplary transmission method of an electronic mail by use of the portable communication terminal of the present invention, wherein a non-contact IC card is equipped in the portable communication terminal for transmitting an electronic mail in this method, includes: receiving by the non-contact IC card, from a passage verification apparatus, information indicating a passage of the non-contact IC card through the passage verification apparatus including a gate for verifying a passage; detecting the passage of the portable communication terminal through the passage verification apparatus by receiving the information on the passage from the non-contact IC card; and controlling transmission of the electronic mail reserved for transmission in accordance with the detection.

As described above, the exemplary portable communication terminal of the present invention detects a passage through the passage verification apparatus, and after the detection, controls transmission of an electronic mail which has been reserved for transmission. Thus, the present invention facilitates automatic transmission of an electronic mail to someone to communicate with just by passing through the passage verification apparatus including a gate of a theater, a ticket gate of a station, etc.

Consequently, it is not necessary to perform operations for creating an electronic mail after passing through the passage verification apparatus.

BRIEF DESCRIPTION OF THE DRAWINGS

Exemplary features and advantages of the present invention will become apparent from the following detailed description when taken with accompanying drawings in which.

DETAILED DESCRIPTION OF THE EXEMPLARY EMBODIMENTS

Next, an exemplary embodiment of the present invention is described with reference to the drawings.

Figure 1:
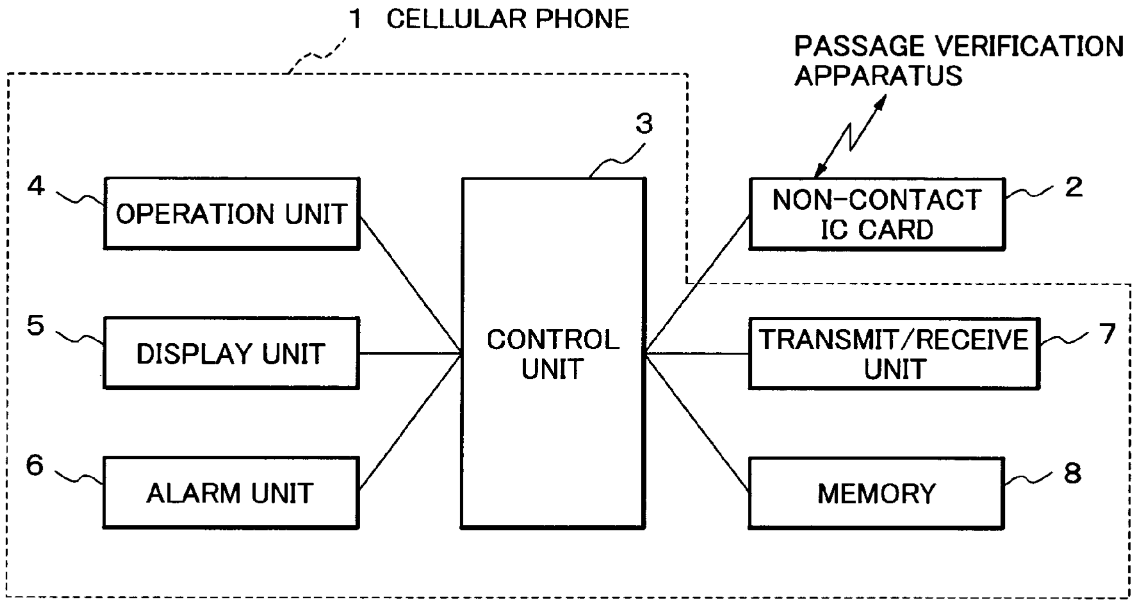
FIG. 1 is a block diagram showing an example of a hardware configuration for embodying the present invention.

FIG. 1 is a block diagram showing an exemplary hardware configuration for embodying the present invention.

FIG. 1 describes an example of a hardware configuration when a portable communication terminal of the present invention is applied to a cellular phone 1. The hardware of this cellular phone 1 includes an operation unit 4, a display unit 5, an alarm unit 6, transmit/receive unit 7, a memory 8, and a control unit 3. In addition, a non-contact IC card 2 is detachably installed in the cellular phone 1 or attached to the outside thereof.

The operation unit 4 performs operations of electronic mailing, such as inputting and editing texts thereof, and transmitting/receiving thereof, and operations of phone functions. The display unit 5 displays relevant information, texts of electronic mail, and the like. The alarm unit 6 reports events to a user of the cellular phone 1 by means of voice, emission of light, and vibration. The transmit/receive unit 7 performs transmission/reception of radio communications. The memory 8 stores a prerequisite program for the operations of the cellular phone 1, information on the electronic mail, various settings of the cellular phone 1 and the like. The control unit 3 controls operations of various units.

In the non-contact IC card 2, various sorts of information have been stored in advance. The information includes: commuter pass information (holder information of the commuter pass, station identification information such as names of stations for entrance/exit, station numbers, a valid time period of the commuter pass, names of railway lines to be used (A line, B line and so forth), and the like); and ticket information (theater identification information such as names of theaters, concert hall names, theater numbers, and concert hall numbers and the like).

The non-contact IC card 2 which is detachably installed in the cellular phone 1 or attached to the outside thereof communicates with a passage verification apparatus, receives entrance/exit approval information (station identification information or theater identification information) from the passage verification apparatus, and transmits this entrance/exit approval information to the cellular phone 1. Here, the passage verification apparatus verifies and approves the passage through a gate at a theater and a concert hall and the like, and a ticket gate in station.

The control unit 3 of the cellular phone 1 performs transmission control of an electronic mail which is reserved for transmission upon reception of this entrance/exit approval information.

Figure 2:
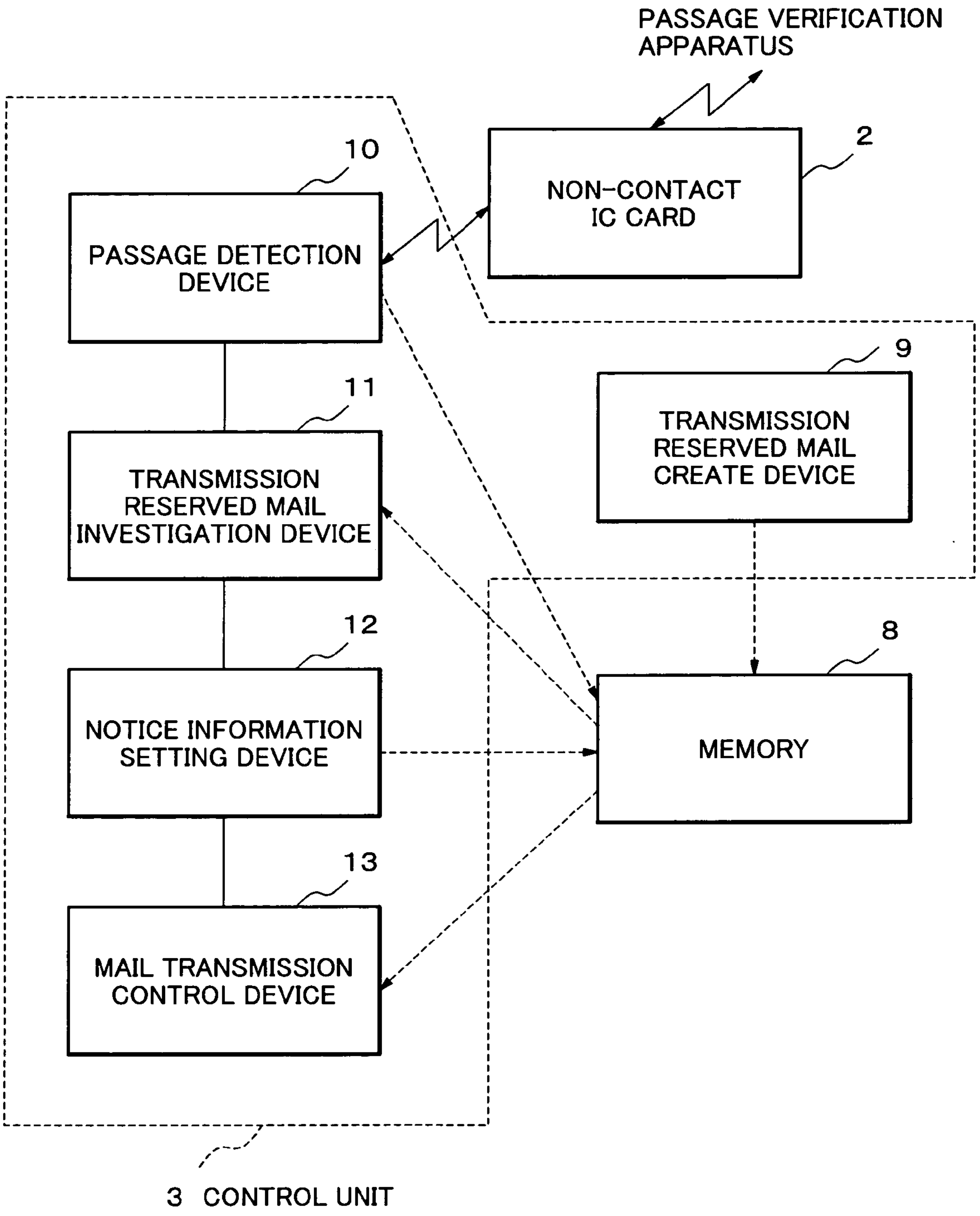
FIG. 2 is a block diagram showing an exemplary embodiment of a portable communication terminal of the present invention.

FIG. 2 is a block diagram showing an exemplary embodiment of a portable communication terminal of the present invention.

The present embodiment includes a transmission reserved mail create device 9, a passage detection device 10, a transmission reserved mail investigation device 11, a notice information setting device 12, and a mail transmission control device 13. Each device can be a hardware or a software function realized by CPU control. At this time, CPU executes any suitable program pre-stored in a memory. Here, the portable communication terminal of this exemplary embodiment is described as a cellular phone 1.

The transmission reserved mail create device 9 is used to create an electronic mail in accordance with operations in the operation unit 4 by a user, and reserves the created electronic mail for transmission. Then subsequently, the electronic mail is stored in the memory 8 with the related information such as station identification and theater identification. For example, this electronic mail is stored in reference to a name of a station or the electronic mail is stored in reference to a name of a theater.

The passage detection device 10 receives entrance/exit approval information which indicates a passage of the non-contact IC card 2 through the passage verification apparatus at a gate or a ticket gate and the like from this non-contact IC card 2. The entrance/exit approval information includes station identification information or theater identification information. Upon reception of the entrance/exit approval information, the passage detecting device 10 detects that the cellular phone 1 itself has passed through the passage verification apparatus.

The transmission reserved mail investigation device 11 investigates whether or not there is an electronic mail reserved for transmission by searching the memory 8. The search is to be conducted upon the passage of the cellular phone 1 through the passage verification apparatus, which is detected by the passage detection device 10.

The notice information setting device 12 acquires the current time from the clock possessed by the cellular phone 1 when the result of investigation shows that there is an electronic mail reserved for transmission. Then the device 12 sets the time, for example, in the body of the electronic mail, which is stored in the memory 8 in reference to station identification information or theater identification information within the entrance/exit approval information received by the passage detection device 10.

Thereby, on the basis of information received from the non-contact IC card 2, information such as which passage verification apparatus the cellular phone 1 has passed through and the time detected at the passing is added to the body of the electronic mail by an adding device in the device 12.

The mail transmission control device 13 controls transmission of the electronic mail by the transmit/receive unit 7 after reading out the electronic mail from the memory 8. The electronic mail has been reserved for transmission with the time data set by the notice information setting device 12.

Next, operation of the portable communication terminal of this exemplary embodiment is described in detail with reference to FIGS. 3 to 5.

Figure 3:
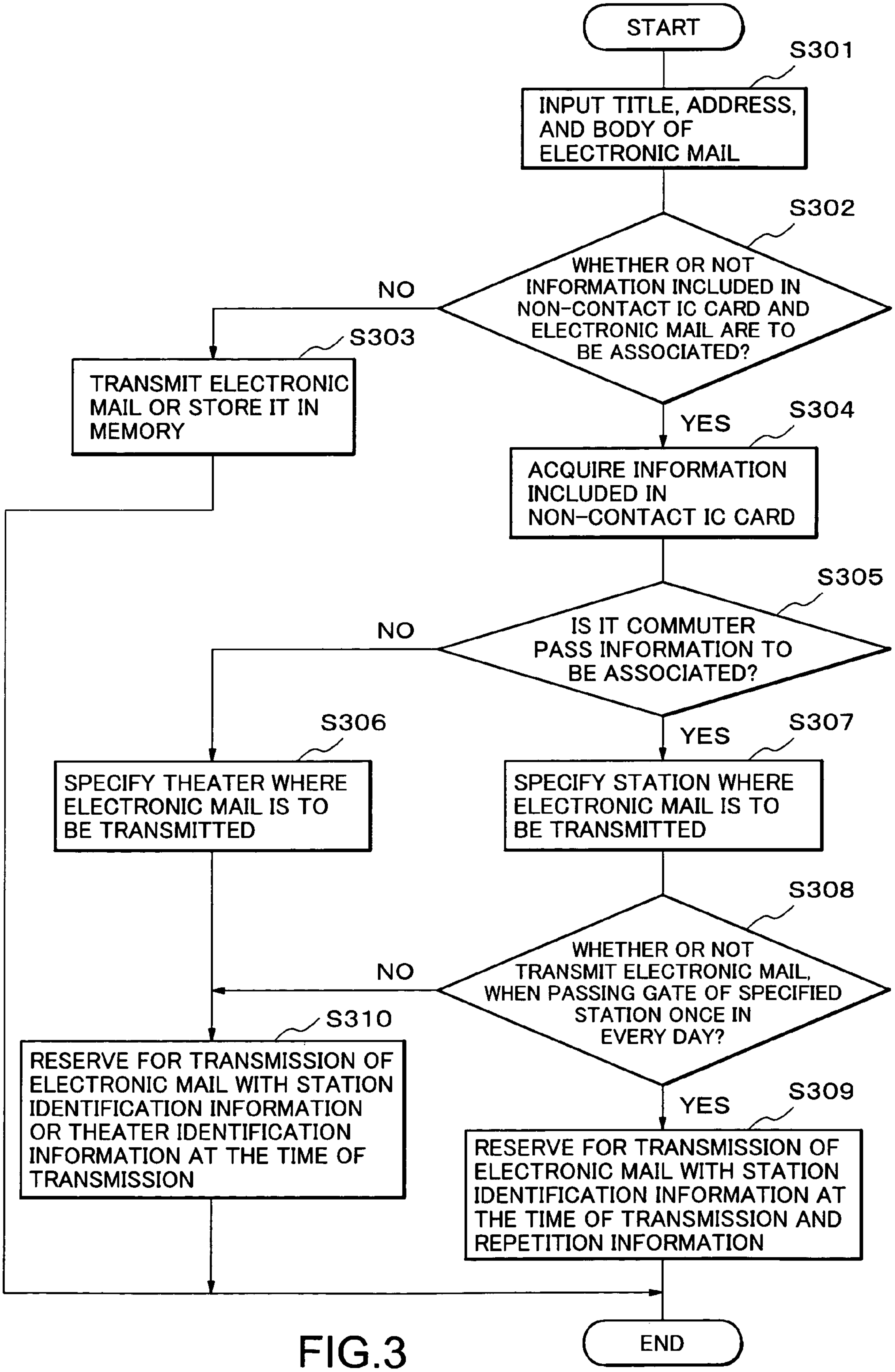
FIG. 3 is a flowchart showing an example of operations in creating an electronic mail and reserving for transmission of the same.

First, with reference to FIG. 3 exemplary operations in creating of an electronic mail and reserving for transmission are described.

Referring to FIG. 2 and in step S301 of FIG. 3, a user of the portable communication terminal (cellular phone 1) operates the operation unit 4 and stores an electronic mail to the cellular phone 1. In other words, the transmission reserved mail create device 9 generates an electronic mail by inputting a title of the electronic mail, an address, and a body text, according to the operation on the operation unit 4 by the user. Then, the transmission reserved mail create device 9 stores this electronic mail in the memory 8.

In step S302 of FIG. 3, the transmission reserved mail create device 9 displays a confirmation display on the display unit 5. Here, the confirmation display is for confirmation whether or not the information in the non-contact IC card 2 should be associated with the electronic mail created in step S301. The information in the non-contact IC card 2 may mean exemplary information relating to a commuter pass, a ticket, etc. The user of the cellular phone 1 operates the operation unit 4 by observing content on the display. The transmission reserved mail create device 9 receives information indicating whether or not the association is selected, depending on the operation on the operation unit 4 by the user. When information indicating a selected choice for non-association is received, the process proceeds to step S303 of FIG. 3. When information indicating a selected choice for association is received, the process proceeds to step S304 of FIG. 3.

In step S303 of FIG. 3, the control unit 3 transmits this created electronic mail immediately and stores it in the memory 8. Then the process is ended.

In step S304 of FIG. 3, the transmission reserved mail create device 9 requests from the non-contact IC card 2 the commuter pass information and ticket information stored in the card, and receives the commuter pass information and ticket information from the non-contact IC card 2.

In step S305 of FIG. 3, the transmission reserved mail create device 9 displays a confirmation display on the display unit 5. Here, the confirmation display is to confirm that the information to be associated is either the commuter pass information or the ticket information. Then, depending on the operation by a user of the cellular phone 1 through the operation unit 4, the transmission reserved mail create device 9 receives information indicating what would be the selected information, either the commuter pass information or ticket information. When the device 9 receives information that the selected information is the commuter pass information, the process proceeds to step S307 of FIG. 3. When the device 9 receives information that the selected information is the ticket information, the process proceeds to step S306 of FIG. 3.

In step S306 of FIG. 3, the transmission reserved mail create device 9 displays an assignment display on the display unit 5. Here the assignment display is to designate in which theater an electronic mail would be transmitted. Then, depending on the operation by a user of the cellular phone 1 through the operation unit 4, the transmission reserved mail create device 9 receives theater identification information identifying a theater and the like where an electronic mail is to be transmitted, and stores it in the memory 8. Then the process proceeds to step S310.

In step S307 of FIG. 3, the transmission reserved mail create device 9 displays an assignment display on the display unit 5. Here the assignment display is to designate in which station an electronic mail would be transmitted. Then, depending on the operation by a user of the cellular phone 1 through the operation unit 4, the transmission reserved mail create device 9 receives station identification information identifying a station where an electronic mail is to be transmitted, and stores it in the memory 8.

In step S308 of FIG. 3, a user of the cellular phone 1 is asked to confirm when this electronic mail would be transmitted. For example, it may be whether once in every day when the cellular phone 1 passes through the ticket gate of the station indicated in the station identification information, or only once at the time of passing. In other words, the transmission reserved mail create device 9 displays a confirmation display on the display unit 5. The confirmation display is to ask a user to confirm when the electronic mail is to be transmitted whether once in every day or once at the time of passing. The transmission reserved mail create device 9 receives information concerning whether the electronic mail will be transmitted once in every day or once at the time of passing, depending on the operation of the user through the operation unit 4. When the information indicating "once in every day" is received, the process proceeds to step S309 of FIG. 3. When the information indicating "once at the time of passing" is received, the process proceeds to step S310 of FIG. 3.

Figure 4:
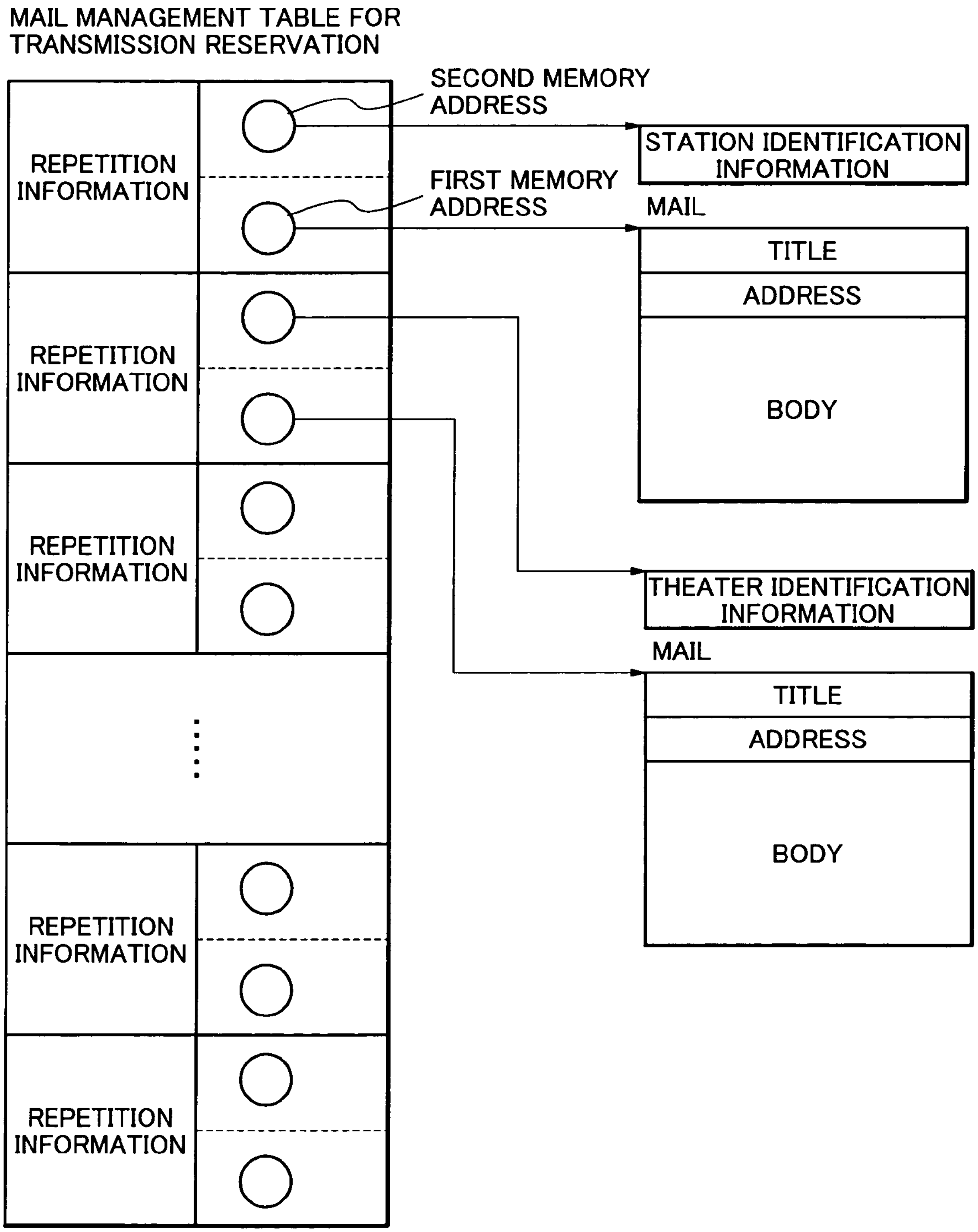
FIG. 4 is a chart showing an example of a management table for mails reserved for transmission.

In step S309 of FIG. 3, the transmission reserved mail create device 9 registers the electronic mail, the station identification information and the repeat information in the management table for transmission reserved mails of FIG. 4, and terminates processes for transmission reservation. This electronic mail is what has been created in step S301. This station identification information is what has been stored in step 307 and is for identification of the station where the electronic mail is to be transmitted. This repeat information is what has been received in step S308 and concerns the indication of transmission "once in every day".

FIG. 4 shows a management table for transmission reserved mails. This table is stored in the memory 8, and includes a first memory address, a second memory address, and repeat information. The first memory address indicates a location for storage of the electronic mail which is reserved for transmission. The second memory address indicates a location for storage of a station identifier of a station or a theater identifier of a theater from which this electronic mail is to be transmitted. The repeat information assigns how often the electronic mail is to be sent either once or once in every day repeatedly. This management table includes a plural number of groups corresponding to the number of the electronic mails reserved for transmission. A group includes the first memory address, the second memory address and the repeat information In step S310 of FIG. 3, the transmission reserved mail create device 9 registers the electronic mail, the station identification information or the theater identification information, and the repeat information in the management table for transmission reserved mails of FIG. 4, and terminates processes for transmission reservation. This electronic mail is what has been created in step S301. This station identification information is what has been stored in step S307. This theater identification information is what has been stored in step S306. This repeat information is what has been received in step S308 and is concerns the indication of transmission "once at the time of passing".

Figure 5:
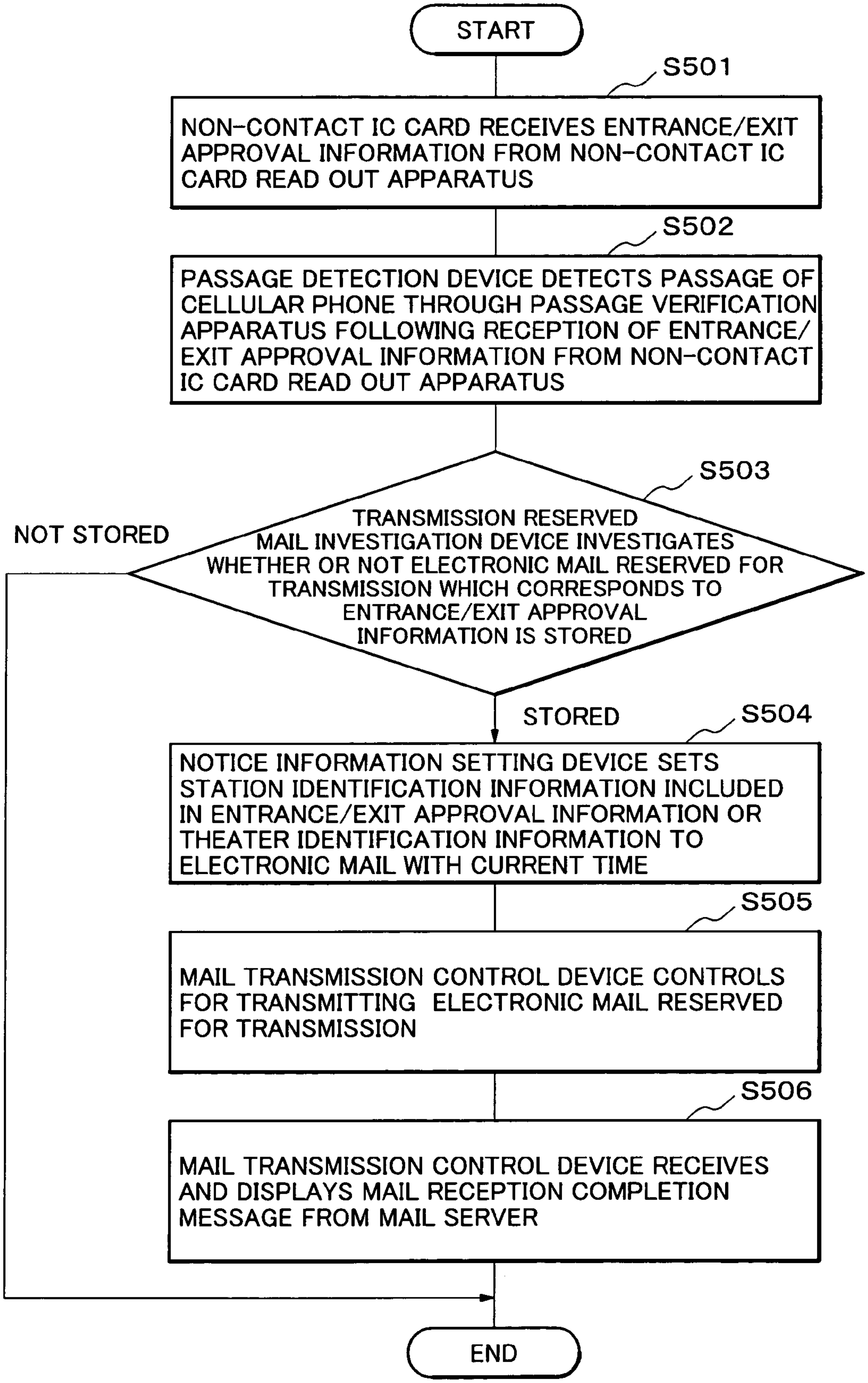
FIG. 5 is a flowchart showing an example of operations in transmitting an electronic mail reserved for transmission at the time of passing a gate/ticket gate.

Next, with reference to FIG. 5, operations for transmission of the electronic mails which are reserved for transmission at the time of passing through a gate/ticket gate are described.

In FIG. 2 and in step S501 of FIG. 5, a user of the cellular phone 1 enters the automatic ticket gate of a station, exits the automatic ticket gate of a station, or enters the entrance gate of a theater. At this moment, the user of the cellular phone 1 holds the cellular phone 1 which includes the non-contact IC card 2 up to a non-contact IC card read out apparatus (not shown in the figures). Both the gate and the ticket gate are a passage verification apparatus which verifies and authenticates a passage, and includes the non-contact IC card read out apparatus therein.

The non-contact IC card 2 in the cellular phone 1 transmits ticket information and commuter pass information which is necessitated for entrance/exit and passage at the gate and ticket gate, to the non-contact IC card read out apparatus.

The non-contact IC card read out apparatus transmits the information sent from the non-contact IC card 2 to a server (not shown in the figures). Based on the information received, the server determines whether or not the entrance/exit and passage at the gate and ticket gate should be approved.

Then, if approved, the server sends the entrance/exit approval information which includes the station identification information or the theater identification information and data for approving entrance/exit, to the non-contact IC card read out apparatus. The non-contact IC card 2 receives the entrance/exit approval information from the non-contact IC card read out apparatus.

In step S502 of FIG. 5, the passage detection device 10 receives the entrance/exit approval information from the non-contact IC card 2. The device 10 detects that the cellular phone 1 has passed through the passage verification apparatus.

In step S503 of FIG. 5, the transmission reserved mail investigation device 11 investigates whether or not the electronic mail, which is reserved for transmission corresponding to the entrance/exit approval information received by the passage detection device 10, is stored in the memory 8. In other words, the transmission reserved mail investigation device 11 investigates whether or not there is an electronic mail reserved for transmission in the management table for transmission reserved mails shown in FIG. 4. Then, if there is an electronic mail reserved for transmission in this table, existence of the electronic mails corresponding to the station identification information, or the theater identification information, included in the entrance/exit approval information within the electronic mails in the table is investigated.

If there are electronic mails corresponding to the station identification information or the theater identification information included in the entrance/exit approval information, then the process proceeds to step S504 of FIG. 5.

If there are no electronic mails reserved for transmission, or when there are no electronic mails corresponding to the station identification information or the theater identification information included in the entrance/exit approval information given that there are some electronic mails reserved for transmission, then the process will be ended.

In step S504 of FIG. 5, the notice information setting device 12 sets the station identification information or the theater identification information included in the entrance/exit approval information into the body of the electronic mail reserved for transmission, as shown in FIG. 4. Furthermore, the device 12 acquires the current time from time measurement means (for example, a clock) pre-equipped in the cellular phone 1, and sets the current time information in the body of electronic mail reserved for transmission, as shown in FIG. 4.

With all those processes, which passage verification apparatus the user of the cellular phone 1 has passed through and the time of the passage are added in the electronic mail reserved for transmission. The recipients of this electronic mail can obtain information on not only the body of the electronic mail, the content of which has already been created by the user of the cellular phone 1, but also the time when the user has passed through a passage verification apparatus and which apparatus he/she has passed through. Therefore, this electronic mail can be used in communication for an appointment and on the way to home.

In step S505 of FIG. 5, the mail transmission control device 13 transmits the electronic mail reserved for transmission to a mail server by controlling the transmit/receive unit 7. Here, in step S504, the station identification information or the theater identification information, and the current time have been set in the electronic mail.

At this moment, before transmission of the electronic mail, a retaining device in the mail transmission control device 13 investigates whether the cellular phone 1 is within the communication range, which indicates an electronic mail can be transmitted, or out of the communication range, which indicates an electronic mail cannot be transmitted. When the result of the investigation indicates that it is out of the communication range, the retaining device in the device 13 retains transmission of the electronic mail till the cellular phone enters the communication range.

Thereafter, the mail transmission control device 13 investigates whether or not the cellular phone 1 has entered the communication range using a background processing of the cellular phone 1. Then, the mail transmission control device 13 automatically transmits this retained electronic mail to a mail server by controlling the transmit/receive unit 7 when the cellular phone 1 has entered the communication range. In other words, when the cellular phone 1 enters the communication range, the mail transmission control device 13 transmits the retained electronic mail, in multi-task processing, in keeping continuously the current function executed by the cellular phone 1. However, when the function currently executed by the cellular phone 1 is a transmission function of an electronic mail, the retained electronic mail will be transmitted later after the function has been finalized.

By doing so, even if the gate and ticket gate is in a poor environment for radio waves where the cellular phone 1 is out of the communication range, the electronic mail can be automatically transmitted when the cellular phone 1 enters the communication range. Furthermore, even when the functions of the cellular phone 1 are used by the user of the cellular phone 1, the retained electronic mail will be automatically transmitted. Therefore, it becomes possible to reduce operations such as checking of un-transmitted mails and re-transmission of the electronic mail by the user himself. Besides, by use of transmission in multi-task processing, the electronic mail will be transmitted while the user keeps continuously using the currently executing function.

In step S506 of FIG. 5, the mail transmission control device 13 receives a mail reception acknowledgement corresponding to the electronic mail transmitted to a mail server from the mail server by controlling transmit/receive unit 7. Thereby the mail transmission control device 13 displays a mail transmission completion display on the display unit 5. The user of the cellular phone 1 confirms this display.

In the description hereinbefore, in step S504 of FIG. 5, the notice information setting device 12 adds station identification information or theater identification information, and the time information to the electronic mail. However, when the station identification information is added to the electronic mail, other information such as a departure time of a train and an arrival time of a train, for example, may be further added to the electronic mail, as described below.

Specifically, in step S501 of FIG. 5, given that the information received from the non-contact IC card read out apparatus is commuter pass information, the server measures the time when it receives the commuter pass information. Then, the server makes inquiries, using a pre-equipped database, a departure time which is closest to the time of the measurement and an arrival time at the other station (arrival station) indicated in the commuter pass on the basis of the time schedule of trains running in the railway lines to be used by the user of the commuter pass. Then, the server sends the obtained departure and arrival times of the train together with the entrance/exit approval information to the non-contact IC card read out apparatus. The non-contact IC card 2 receives the departure and arrival times together with the entrance/exit approval information from the non-contact IC card read out apparatus.

Next, in step S502 of FIG. 5, the passage detection device 10 receives the departure and arrival times together with the entrance/exit approval information from the non-contact IC card 2, and detects that the cellular phone 1 has passed the passage verification apparatus.

Then in step S503 of FIG. 5, when the electronic mail reserved for transmission corresponding to the entrance/exit approval information is stored in the memory 8, the process proceeds to step S504 of FIG. 5. In step S504 of FIG. 5, the notice information setting device 12 sets the departure and arrival times of the train obtained in step S502 together with the current time obtained from the cellular phone 1 in the body of the electronic mail reserved for transmission.

With those processes, it is possible to inform, to the partner to communicate with, for example an arrival time of the user of the cellular phone 1 at the station where the train, on which the user will ride, will depart, the departure time of the train to ride, and an arrival time at the destination station.

In the description hereinbefore, it is assumed that the non-contact IC card 2 in which commuter pass information and ticket information is pre-stored is set between the cellular phone 1 and passage verification apparatus. The non-contact IC card 2 transmits this commuter pass information and ticket information to the passage verification apparatus, and then receives entrance/exit approval information from the passage verification apparatus. The cellular phone 1 receives entrance/exit approval information from the non-contact IC card 2, and by use of this entrance/exit approval information, transmits the electronic mail reserved for transmission.

However, by setting close range communication devices both in the cellular phone 1 and passage verification apparatus, those communication devices can be used to substitute the non-contact IC cards 2. Here, the close range communication devices are based on technologies, such as infrared light and Bluetooth.

In the case of using this communication device, commuter pass information and ticket information are pre-stored in the memory 8. The communication control function of the non-contact IC card 2 is assigned to this communication device, and the storage control function of the non-contact IC card 2 is assigned to the control unit 3 and memory unit 8 of the cellular phone 1. In other words, this communication device receives commuter pass information and ticket information from the memory 8 of the cellular phone 1, and transmits the commuter pass information and ticket information to the passage verification apparatus. Thereafter, the communication device receives entrance/exit approval information from the passage verification apparatus. The cellular phone 1 receives entrance/exit approval information from the communication device, and by use of this entrance/exit approval information, transmits the electronic mail reserved for transmission.

As described hereinbefore, the present invention facilitates automatic transmission of an electronic mail to the partner to communicate with just by passing through a gate of a theater, a ticket gate of a station, etc. Thus, it is not necessary to perform operations for creating an electronic mail after passing through the gate of a theater and the ticket gate of a station.

Furthermore, according to the present invention, a time stamp of passing through a gate and ticket gate is automatically added to a body of an electronic mail which will be automatically transmitted to a partner to communicate with. Therefore, it is not necessary to perform operations for writing in a time in a body of electronic mail by checking a time before passing through a gate or a ticket gate of a station.

Furthermore, in the case of transmitting an electronic mail from geographical locations where the condition of radio waves is poor and often indicated as out of communication range, such as a ticket gate of a station, which is located within a building, a determination of a communication range is performed before transmission. If "out of the communication range" is determined, transmission of an electronic mail is retained until "within the communication range" is determined. Even if a user is operating other functions, an electronic mail which is retained un-transmitted will be able to be automatically transmitted by use of multi-task functionality of the cellular phone. Accordingly, the automatic transmission can reduce operations such as checking of un-transmitted electronic mails and re-transmission thereof by the user himself.

It is noted that the exemplary embodiments above are described in relation to a commuter ticket, or a theater ticket gate, but as would be evident to one of ordinary skill in the art taking the present application as a whole, the invention would find great utility with any gated structure (e.g., museum, casino, stadium, concert hall, etc.) or passageway.

While the present invention has been described in connection with certain exemplary embodiments, it is to be understood that the subject matter encompassed by the present invention is not limited to those specific embodiments. On the contrary, it is intended to include all alternatives, modifications and equivalents as can be included within the spirit and scope of the following claims.

Additionally, it is the inventor's intent to retain all equivalents of the claimed invention even if the claims are amended during prosecution.

What is claimed is:

1. A portable communication terminal, comprising:

a non-contact IC card which receives, from a passage verification apparatus, information including identification information of an institution in which the passage verification apparatus is placed and indicating a passage of the non-contact IC card through the passage verification apparatus including a gate for verifying a passage;

passage detecting means for detecting a passage of the portable communication terminal through the passage verification apparatus by receiving the information on the passage from the non-contact IC card; and mail transmission control means for controlling a transmission of an electronic mail reserved for transmission in association with the identification information of the institution in accordance with the detection.

2. The portable communication terminal according to claim 1, further comprising:

adding means for automatically adding information to the electronic mail to be transmitted, said information representing the passage verification apparatus in which the passage takes place and a time of detection of the passage, on a basis of the information received from the non-contact IC card.

3. The portable communication terminal according to claim 1, wherein the mail transmission control means investigates, before transmission of the electronic mail, whether the portable communication terminal is within a communication range, which indicates the electronic mail can be transmitted, or out of the communication range, which indicates the electronic mail cannot be transmitted, and if a result of the investigation indicates the portable communication terminal is out of the communication range, retains transmission of the electronic mail until the portable communication terminal enters the communication range.

4. The portable communication terminal according to claim 3, wherein the mail transmission control means automatically transmits the retained electronic mail when the portable communication terminal enters the communication range.

5. A transmission method of an electronic mail by use of a portable communication terminal equipped with a non-contact IC card, the transmission method comprising:

receiving by the non-contact IC card, from a passage verification apparatus, information including identification information of an institution in which the passage verification apparatus is placed and indicating a passage of the non-contact IC card through the passage verification apparatus including a gate for verifying a passage;

detecting the passage of the portable communication terminal through the passage verification apparatus by receiving the information on the passage from the non-contact IC card; and controlling a transmission of the electronic mail reserved for transmission in association with the identification information of the institution in accordance with the detection.

6. The transmission method of an electronic mail according to claim 5, further comprising:

detecting which passage verification apparatus the passage takes place, on a basis of the information received from the non-contact IC card;

measuring a time at the passage when the passage through the passage verification apparatus is detected; and adding information to the electronic mail to be transmitted, said information representing the passage verification apparatus in which the passage takes place and the time of detection of the passage.

7. The transmission method of an electronic mail according to claim 5, further comprising:

investigating, before transmission of the electronic mail, whether the portable communication terminal is within a communication range, which indicates the electronic mail can be transmitted, or out of the communication range, which indicates the electronic mail cannot be transmitted; and retaining transmission of the electronic mail until the portable communication terminal enters the communication range, if a result of the investigation indicates the portable communication terminal is out of the communication range.

8. The transmission method of an electronic mail according to claim 7, wherein the retained electronic mail is automatically transmitted when the portable communication terminal enters the communication range.

9. A portable communication terminal, comprising:

a non-contact IC card which receives, from a passage verification apparatus, information including identification information of an institution in which the passage verification apparatus is placed and indicating a passage of the non-contact IC card through the passage verification apparatus including a gate for verifying a passage;

passage detector that detects passage of the portable communication terminal through the passage verification apparatus by receiving the information on the passage from the non-contact IC card; and a mail transmission controller that controls transmission of an electronic mail reserved for transmission in association with the identification information of the institution in accordance with the detection.

10. The portable communication terminal according to claim 9, further comprising:

an adding device that adds information automatically to the electronic mail to be transmitted, said information representing the passage verification apparatus in which the passage takes place and a time of detection of the passage, on a basis of the information received from the non-contact IC card.

* * * * *